March 25, 1958 — G. M. HAYNES — 2,827,731
TRANSPARENT FISHING FLOAT
Filed Oct. 6, 1953
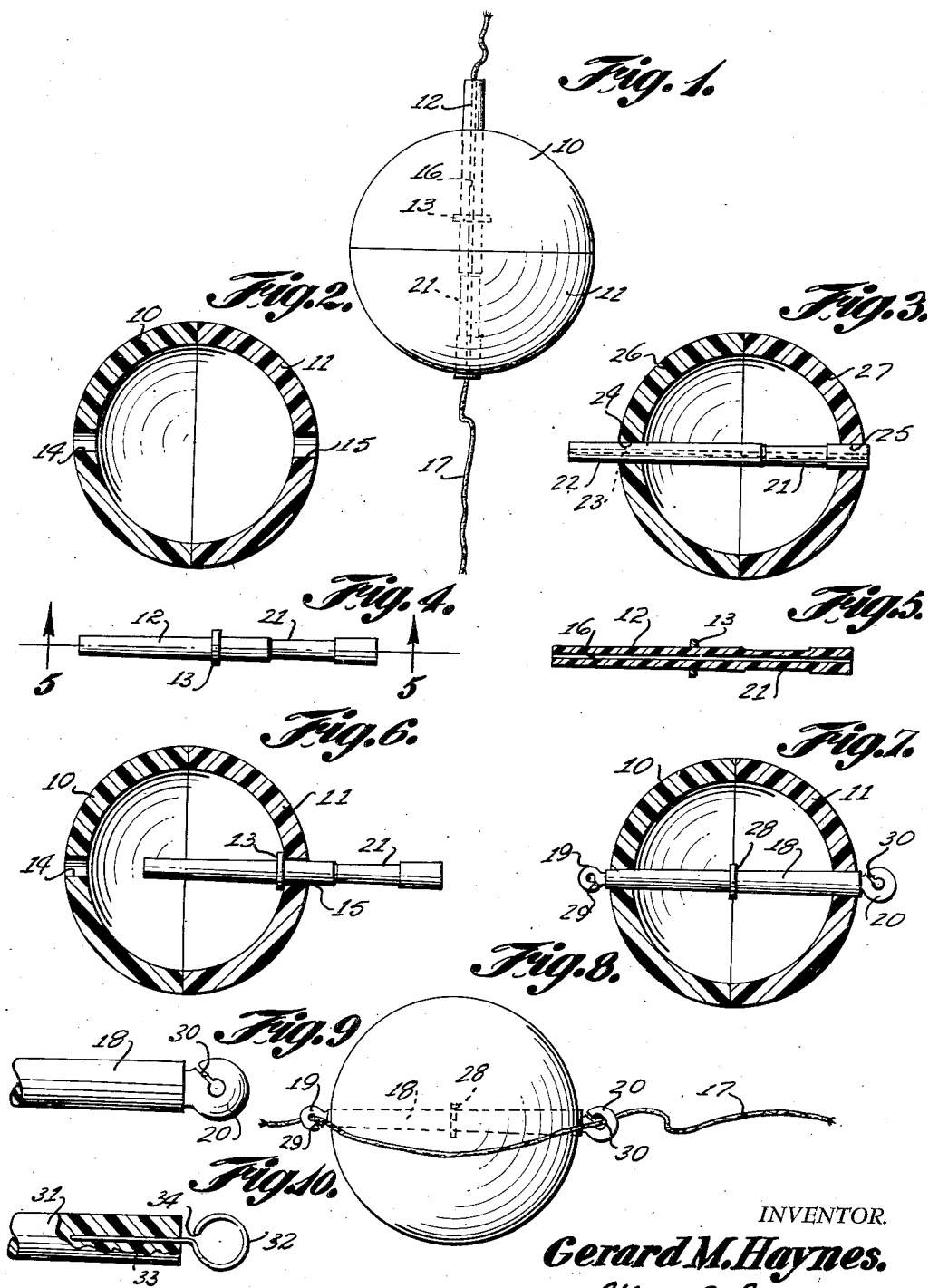
INVENTOR.
Gerard M. Haynes.
BY Victor J. Evans & Co.
ATTORNEYS United States Patent Office 2,827,731
Patented Mar. 25, 1958

2,827,731

TRANSPARENT FISHING FLOAT

Gerard M. Haynes, Los Angeles, Calif.

Application October 6, 1953, Serial No. 384,408

3 Claims. (Cl. 43—43.14)

This invention relates to a fishing float or bob, and in particular a float having a line attaching tube extended therethrough with the tube positioned to close and substantially seal filling openings in the wall of the float whereby a quantity of liquid in the float may remain constant.

The purpose of this invention is to provide a fishing float or bob that simulates a natural bubble on the water and in which the quantity of liquid in the float is controlled with a line attaching tube extended therethrough.

This invention is an improvement over the float of my prior Patent #2,275,076 in that the fishing line is attached to the float with a sliding tube or rod extended through the float which provides means for regulating the amount of liquid in the float and by employing a sliding tube or rod with a collar or intermediate section of a diameter greater than that of the tube positioned in the float chamber of the bob accidental displacement of the tube or rod is prevented.

In casting it is necessary to adjust the weight of the float to compensate for the distance and other conditions. With this thought in mind this invention contemplates a float in the form of a sphere, or hemisphere formed of transparent or opaque material and having aligned openings therethrough whereby a fishing line may be placed through a tube mounted in said openings, or may be trained through eyes on the ends of a rod slidably mounted in the openings.

The object of this invention is, therefore, to provide means for mounting a line attaching tube in a transparent sphere, forming a fishing float where the tube seals filling openings of the float.

Another object of the invention is to provide means for attaching a fishing line to a float whereby liquid is placed in the float through the line attaching means and wherein the line attaching means is adapted to be actuated to regulate the amount of liquid in the float.

A further object of the invention is to provide a fishing float in which a tube or rod extends through the float for attaching a fishing line and wherein the float is of a simple and economical construction.

With these and other objects and advantages in view the invention embodies a pair of complementary sections of transparent or opaque material with aligned openings extended through the sections and with a line attaching tube extended through the openings and adapted to seal, or substantially seal the openings through the sections.

Other features and advantages of the invention will appear from the following description taken in connection with the drawing, wherein:

Figure 1 is an elevational view illustrating the float with the line receiving tube extended therethrough in an upright position.

Figure 2 is a cross section through the float taken on a line extended through the tube receiving openings thereof.

Figure 3 is a section, similar to that shown in Fig. 2, showing a tube extended through said tube receiving openings.

Figure 4 is a detail illustrating a modification wherein a collar is provided on the intermediate portion of the tube to prevent accidental displacement of the tube from one of the hemispheres of the float.

Figure 5 is a longitudinal section through the tube taken on line 5—5 of Fig. 4.

Figure 6 is a cross section through the float also similar to that shown in Figs. 2 and 3 and illustrating a modification wherein the tube is provided with a collar and wherein the collar is positioned substantially midway of the ends of the tube.

Figure 7 is a section also similar to that shown in Figs. 2 and 3 illustrating a further modification wherein a rod is provided with a collar at the center and also wherein the ends are provided with eyes which are positioned to receive a fishing line.

Figure 8 is an elevational view showing a fishing line threaded through the eyes of the rod as shown in Fig. 7.

Figure 9 is a detail illustrating a split eye on one end of the rod shown in Fig. 7, with part of the rod broken away and with the sphere omitted.

Figure 10 is a detail showing a further modification wherein an eye, formed of wire or other comparatively thin material is mounted in the end of the solid tube and in which part of the rod is broken away.

Referring now to the drawing wherein like reference characters denote corresponding parts the improved fishing line float or bob of this invention includes complementary sections 10 and 11 providing a hollow transparent body or shell and a transparent tube 12 and the tube is provided with a collar 13 which limits sliding movement thereof in openings 14 and 15 of the sections 10 and 11, respectively.

In the design illustrated in Figs. 1, 4, 5, and 6 the tube is provided with a longitudinally disposed opening or bore 16 through which a fishing line 17 extends, and in the design illustrated in Figs. 7, 8 and 9 the ends of a rod 18 are provided with eyes 19 and 20 through which the fishing line is threaded, as illustrated in Fig. 8.

The rod is preferably provided with a tapering outer surface and the outer surface may be relieved, providing a recess 21, in the intermediate part of the rod reducing the weight and also the quantity of material used in the rod.

In the design illustrated in Fig. 3 a tube 22 having a line receiving opening 23 extended therethrough is slidably mounted in openings 24 and 25 of sections 26 and 27, respectively of a float and, in this design, the tube is pressed into the substantially conical-shaped openings by pressing on the large end, and the tube is removed by pressing on the opposite end. By this means the float is readily sealed and the quantity of liquid therein may be regulated by removing and replacing the tube with the liquid replenished as the tube is removed.

In the design illustrated in Figs. 7, 8 and 9 the tube or rod 18 which is also provided with a conical-shaped outer surface is provided with a collar 28 and the eyes 19 and 20 are provided with line receiving slots 29 and 30, respectively.

In the design illustrated in Fig. 10 the tube is replaced with a rod 31 and eyes 32 are formed in the ends with stems 33 extended from the eyes molded in the ends, as shown, and with the eyes provided with line receiving openings 34.

With the parts formed in this manner, the ball or sphere forming the float or bob being the same in the different designs, a float is provided that may be used hollow or that may be filled or partly filled with water or other liquid whereby the weight of the float is readily adjustable to compensate for conditions under which the fishing line on which the float is positioned is used.

The two sections of the float or sphere are secured together with a suitable adhesive, or with acid, or other suitable means.

Although the fishing line float of this invention is disclosed and described as being spherical and as being of transparent material, it will be understood that it may be of other designs or of any other shape, and it may also be opaque, translucent, or made of other suitable material.

It will be understood that other modifications, within the scope of the appended claims, may be made in the design and arrangement of the parts without departing from the spirit of the invention.

What is claimed is:

1. In a fishing line float, a hollow transparent body including first and second similar sections having their adjacent edge portions secured together, said first and second sections being made of transparent material, there being diametrically opposed first and second openings in said first and second sections, said second opening being of greater diameter than said first opening, a tube extending through said openings and provided with a longitudinally extending bore, a fishing line extending through said bore, said bore permitting the line to slide freely through the bore at the time the fish strikes the line, said tube being made of transparent material, said tube having a tapered outer surface so as to define a first end portion mounted for movement into and out of said first opening, and said tube further including a second end portion of greater diameter than said first end portion, and said second end portion being mounted for movement into and out of engagement with said second opening concurrently with movement of the first end portion into and out of said first opening, said tube remaining in engagement with said openings by frictional contact until the tube is manually moved, said tube providing simultaneous hermetic sealing of said openings when engaged therein, the length of said tube being greater than the distance between said openings, said tube being movable manually whereby colorless fluid can flow in through one of said openings while air vents out the other opening, said tube being frictionally held in position to retain a desired amount of clear liquid in the body, and a collar of greater diameter than said tube arranged on said tube intermediate the ends thereof, the inner and outer wall surface of said body being transparent so that fish will not be frightened away, the float being liquid filling so that it can be used as a casting float, said float when filled having a specific gravity slightly greater than water whereby the float will normally assume a position slightly below the surface or when partially filled will float on the surface, said float retaining the same specific gravity at which it is set.

2. A combined casting weight and float adapted to be filled with water to preclude visual detection when immersed in water comprising a thin-walled hollow shell of transparent material having an internal cavity and providing aligned openings therethrough; and an elongated tapered transparent closure member extended through the shell and mounted in the shell for reciprocal longitudinal positioning therein, said closure member being adapted for connection to a fishline and having portions simultaneously engageable with the shell in the openings to seal the same and simultaneously displaceable from the openings correspondingly to open the same.

3. A combined casting weight and float, of adjustable specific gravity between predetermined limits which is substantially invisible when immersed in water in its heaviest adjusted condition, comprising a thin-walled hollow shell of transparent material having an internal cavity and providing aligned openings therethrough through which the cavity may be entirely filled with water and entirely drained of water, which shell and contents when filled with water are heavier than water and which shell and contents when filled with water and air are lighter than water; an elongated tapered tubular closure member adapted to have a fishline freely slidably threaded therethrough, said closure member being extended through the openings of the shell and mounted for reciprocal longitudinal movement therein, said closure member also having portions simultaneously engageable with the shell in the openings to seal the same and simultaneously displaceable from the openings correspondingly to open the same; and means integral with the closure member within the cavity of a size in relation to the openings precluding removal of the closure member from the shell.

References Cited in the file of this patent

UNITED STATES PATENTS

| | | |
|---|---|---|
| 1,468,720 | Low | Sept. 25, 1923 |
| 2,275,076 | Haynes | Mar. 3, 1942 |
| 2,509,704 | Streitwieser | May 30, 1950 |
| 2,726,474 | Soskice | Dec. 13, 1955 |

FOREIGN PATENTS

| | | |
|---|---|---|
| 19,969 | Great Britain | 1898 |
| 614,801 | Great Britain | 1948 |